(12) United States Patent
Kamiyama

(10) Patent No.: US 8,002,379 B2
(45) Date of Patent: Aug. 23, 2011

(54) DROPLET DISCHARGING DEVICE, METHOD OF MEASURING WEIGHT, METHOD OF DISCHARGING A LIQUID, AND METHOD OF MANUFACTURING A COLOR FILTER

(75) Inventor: Nobuaki Kamiyama, Suwa (JP)

(73) Assignee: Seiko Epson Corporation (JP)

( * ) Notice: Subject to any disclaimer, the term of this patent is extended or adjusted under 35 U.S.C. 154(b) by 855 days.

(21) Appl. No.: 11/872,327

(22) Filed: Oct. 15, 2007

(65) Prior Publication Data

US 2008/0094440 A1    Apr. 24, 2008

(30) Foreign Application Priority Data

Oct. 24, 2006    (JP) ................................ 2006-288370

(51) Int. Cl.
    *B41J 29/393* (2006.01)
(52) U.S. Cl. ....................................................... 347/19
(58) Field of Classification Search .................. None
    See application file for complete search history.

(56) References Cited

U.S. PATENT DOCUMENTS

| 5,574,485 A | 11/1996 | Anderson et al. |
| 2005/0045096 A1* | 3/2005 | Kojima .......................... 118/323 |
| 2006/0050102 A1* | 3/2006 | Kojima ............................ 347/19 |

FOREIGN PATENT DOCUMENTS

| JP | 08-118668 | 5/1996 |
| JP | 11-248927 | 9/1999 |
| JP | 2004-209429 | 7/2004 |
| JP | 2005-254797 | 9/2005 |
| JP | 2006-116437 | 5/2006 |
| JP | 2006-220539 | 8/2006 |

* cited by examiner

*Primary Examiner* — Omar Rojas
(74) *Attorney, Agent, or Firm* — Harness, Dickey & Pierce, P.L.C.

(57) ABSTRACT

A droplet discharging device for drawing by discharging a liquid as droplets on a work from an discharging head in accordance with a main scan for relatively moving the work and the discharging head facing each other, includes a plurality of carriages each mounting a plurality of the discharging heads, a weighing mechanism for measuring weight of the discharged liquid for every discharging head, and a main scan moving mechanism for moving the weighing mechanism and the work in a direction of the main scan independently from each other, wherein the weighing mechanism is disposed in a direction perpendicular to the direction of the main scan and along a drawing area in which the plurality of discharging heads mounted on the plurality of carriages can perform drawing by discharging.

4 Claims, 10 Drawing Sheets

DROPLET DISCHARGING DEVICE, METHOD OF MEASURING WEIGHT, METHOD OF DISCHARGING A LIQUID, AND METHOD OF MANUFACTURING A COLOR FILTER

BACKGROUND OF THE INVENTION

1. Technical Field

The present invention relates to a droplet discharging device equipped with a weighing mechanism for measuring the weight of the discharged liquid, a method of measuring weight of the liquid, a method of discharging the liquid, and a method of manufacturing a color filter.

2. Related Art

As a droplet discharging device equipped with a weighing mechanism for measuring the weight of the discharged liquid, there is known a droplet discharging device having at least one droplet discharging head for discharging droplets to a work, and an discharging amount measuring liquid receiving section for receiving the droplet discharged by the droplet discharging head for measuring the amount of discharging of the droplet of the droplet discharging head (see JP-A-2004-209429). Further, there is proposed a droplet discharging system equipped with a chamber, which houses the droplet discharging device, and the inside environmental condition of which is adjustable.

In the droplet discharging system described above, when the droplet discharging head ejects a droplet to the discharging amount measuring liquid receiving section, the environmental condition inside the chamber is controlled to be the same environmental condition controlled when a droplet is discharged to a work. According to the document, by thus accurately measuring the amount of discharging of the droplet previously, the amount of discharging can be adjusted to an appropriate value.

On the other hand, there is known a droplet discharging device provided with a plurality of head units (or carriages) each mounting a plurality of droplet discharging heads in accordance with growth in the size of the substrate (see JP-A-2005-254797).

In the case in which the droplet discharging system described above is intended to be applied to the past droplet discharging device provided with the plurality of head units, a large sized chamber is required for controlling the environmental condition for measuring the weight or drawing on the work by discharging droplets. In such a condition, it has problematically been difficult to make the environmental condition or the drive condition of the droplet discharging head the same in both the weight measurement and the actual drawing operation by appropriately arranging the weighing mechanism for measuring the weight of a droplet and the head units.

SUMMARY

In consideration of the above problem, the invention has an advantage of providing a droplet discharging device, a method of measuring weight of a liquid, a method of discharging a liquid, and a method of manufacturing a color filter capable of appropriately measuring the weight of the liquid discharged from a plurality of discharging heads mounted on a plurality of carriages.

A droplet discharging device according to an aspect of the invention is a droplet discharging device for drawing by discharging a liquid as droplets on a work from a discharging head in accordance with a main scan for relatively moving the work and the discharging head facing each other, includes a plurality of carriages each mounting a plurality of the discharging heads, a weighing mechanism for measuring weight of the discharged liquid for every discharging head, and a main scan moving mechanism for moving the weighing mechanism and the work in a direction of the main scan independently from each other, wherein the weighing mechanism is disposed in a direction perpendicular to the direction of the main scan and along a drawing area in which the plurality of discharging heads mounted on the plurality of carriages can perform drawing by discharging.

According to the present configuration, the main scan moving mechanism for moving the weighing mechanism and the work in the direction of the main scan independently from each other is provided, and the weighing mechanism is disposed in a direction perpendicular to the direction of the main scan and along the drawing area in which the plurality of discharging heads mounted on the plurality of carriages can perform drawing by discharging. Therefore, by using the main scan moving mechanism, the plurality of carriages in the arrangement condition in the drawing area can directly be disposed facing the weighing mechanism. Therefore, the weight of the liquid discharged from the plurality of droplet discharging heads mounted thereon can be measured without modifying the arrangement of the plurality of carriages when actually discharging the liquid to the work. Accordingly, the droplet discharging device, which is equipped with the weighing mechanism capable of measuring the weight of the liquid more accurately with the plurality of carriages in the arrangement condition of actually discharging the liquid to perform drawing in comparison with the case in which the weight measurement is performed with the plurality of carriages divided, can be provided.

According to another aspect of the invention, the weighing mechanism is provided with at least the same number of weighing devices as the number of the carriages and corresponding to the plurality of carriages. According to the present configuration, the number of the carriages and the number of the weighing devices are at least the same. Therefore, in comparison with the case in which the number of the weighing devices is smaller than the number of the carriages, the number of operations of relatively moving the plurality of carriages and the weighing mechanism to dispose the discharging heads, which are the measuring objects, facing the weighing devices can be reduced. Therefore, the weight measurement can efficiently be performed.

Further, it is preferable that the weighing mechanism includes a first droplet receiving section provided for each of the plurality of carriages and capable of receiving the droplet discharged from at least one of the discharging heads, and a second droplet receiving section disposed in accordance with an arrangement of the plurality of discharging heads mounted on the plurality of carriages so as to surround the first droplet receiving section. According to the present configuration, the liquid can be discharged to the second droplet receiving section from the discharging head, which is not the measuring object, while performing the weight measurement by discharging the liquid to the first droplet receiving section from the discharging head as the measuring object. Therefore, in comparison with the case of weighing the liquid discharged by intermittently driving the plurality of discharging heads, the weight of the liquid discharged from the discharging head as the measuring object can more appropriately be measured in the condition closer to the actual liquid discharging and drawing condition in which the plurality of discharging heads is driven substantially simultaneously.

According to another aspect of the invention, there is provided a method of measuring weight for measuring the weight of a liquid discharged from a plurality of discharging heads mounted on a plurality of carriages including the steps of arranging the plurality of carriages in a weighing area while maintaining an arranging condition in a drawing area, and discharging the liquid as droplets from each of the discharging heads mounted on the plurality of carriages to measure the weight of the liquid discharged by each of the discharging heads.

According to the present method, in the step of arranging the plurality of carriages, the plurality of carriages is arranged in the weighing area while maintaining the arranging condition in the drawing area. Therefore, in comparison with the case in which the plurality of carriages are divided to be disposed in the weighing area, the weight of the liquid can more appropriately be measured in a condition closer to the condition of actually discharging the liquid for drawing.

According to another aspect of the invention, in the step of discharging the liquid described above, the number of dischargings enough for measuring the weight is set to eject the droplets. According to the present configuration, since the number of dischargings enough for measuring the weight is set in order to eject the liquid, a stable weighing result can be obtained even if the amount of the droplet to be discharged is minute. Further, by dividing the measured weight of the liquid by the number of dischargings described above, the weight per droplet can be obtained with good accuracy even if the amount of the droplet is minute.

Further, it is preferable to further include the steps of comparing the weight of the liquid discharged by each of the discharging heads obtained in the step of discharging the liquid with desired weight of the liquid to be discharged from the discharging head to judge whether or not the difference between the measured weight and the desired weight is within a predetermined range, and performing maintenance of each of the discharging heads in response to a negative judgment in the step of comparing the weight. According to the present configuration, whether or not the liquid has appropriately been discharged can be judged by the step of comparing the weight. Further, since the maintenance step is performed in response to the negative judgment, it is possible to perform the step of discharging the liquid again after stabilizing the clogging or the discharging conditions of the discharging head. Thus, the liquid can more reliably be discharged to perform the weight measurement.

Further, in the step of discharging the liquid described above, the liquid is preferably discharged also from the discharging head, which is not the measuring object, out of the plurality of the discharging heads. According to the present configuration, the droplets are discharged also from the discharging head, which is not the measuring object, while discharging the liquid for the measurement from the discharging head, which is the measuring object. Therefore, in comparison with the case of measuring the weight of the liquid discharged by driving only the droplet discharging head as the measuring object, the discharging state of the droplet can previously be stabilized in preparation for the weight measurement. Therefore, the weight of the liquid discharged from the discharging head as the measuring object can more appropriately be measured.

According to another aspect of the invention there is provided a method of discharging a liquid for drawing by discharging the liquid to a work from a plurality of discharging heads mounted on a plurality of carriages, including the steps of arranging the plurality of carriages in a weighing area while maintaining an arranging condition in a drawing area, discharging the liquid as droplets from each of the discharging heads mounted on the plurality of carriages to measure the weight of the liquid discharged by each of the discharging heads, adjusting an amount of discharging of the droplet discharged from each of the discharging heads based on weight information of the liquid obtained in the step of discharging the liquid, and drawing by discharging the droplets from each of the discharging heads to a desired area of the work.

According to the present method, in comparison with the case in which the plurality of carriages are divided to be disposed in the weighing area, the weight of the liquid can more appropriately be measured in a condition closer to the condition of actually discharging the liquid for drawing. Therefore, in the step of adjusting an amount of discharging, the amount of discharging of the droplet discharged from each of the discharging head can be adjusted based on the appropriately measured weight information of the liquid. Further, in the step of drawing, an appropriate amount of liquid can be applied to a desired area of the work by drawing by discharging the droplets from each of the discharging heads thus adjusted.

According to another aspect of the invention, in the step of discharging the liquid described above, the number of dischargings enough for measuring the weight is set to eject the droplets. According to the present configuration, by dividing the measured weight of the liquid by the number of dischargings, the weight per droplet can be obtained with good accuracy even if the amount of the droplet is minute. Therefore, an appropriate amount of liquid can be provided in a desired area of the work with good accuracy.

Further, it is preferable to further include the steps of comparing the weight of the liquid discharged by each of the discharging heads obtained in the step of discharging the liquid with desired weight of the liquid to be discharged from the discharging head to judge whether or not the difference between the measured weight and the desired weight is within a predetermined range, and performing maintenance of each of the discharging heads in response to a negative judgment in the step of comparing the weight. According to the present configuration, whether or not the liquid has appropriately been discharged can be judged by the step of comparing the weight. Further, since the maintenance step is performed in response to the negative judgment, it is possible to perform the step of discharging the liquid again after stabilizing the clogging or the discharging conditions of the discharging head. Thus, the liquid can more reliably be discharged to perform the weight measurement. Therefore, an appropriate amount of liquid can be provided in a desired area of the work with good stability.

Further, in the step of discharging the liquid described above, the liquid is preferably discharged also from the discharging head, which is not the measuring object, out of the plurality of the discharging heads. According to the present configuration, the droplets are discharged also from the discharging head, which is not the measuring object, while discharging the liquid for the measurement from the discharging head, which is the measuring object. Therefore, in comparison with the case of measuring the weight of the liquid discharged by driving only the droplet discharging head as the measuring object, the discharging state of the droplet can previously be stabilized in preparation for the weight measurement. Therefore, the weight of the liquid discharged from the discharging head as the measuring object can more appropriately be measured. Therefore, a more appropriate amount of liquid can be provided in a desired area of the work.

According to another aspect of the invention, there is provided a method of manufacturing a color filter having at least three colors of colored layers in a plurality of colored areas partitioned on a substrate, including the steps of drawing by discharging liquids respectively containing at least three colors of colored layer forming materials to the plurality of colored areas using the method of discharging a liquid according to the above aspect of the invention, and solidifying the liquid discharged as a drawing thereby forming the at least three colors of colored layers.

According to the present method, there is used the method of discharging a liquid according to the above aspect of the invention, which is capable of applying an appropriate amount of liquid to the desired area of the work. Therefore, in the drawing step, the liquids respectively containing at least three colors of colored layer forming materials are applied to the plurality of colored areas, and in the solidifying step, the at least three colors of colored layers with an appropriate film thickness can be formed by solidifying the liquid thus discharged. Therefore, the color filter with a desired optical characteristic can be manufactured.

BRIEF DESCRIPTION OF THE DRAWINGS

The invention will now be described with reference to the accompanying drawings, wherein like numbers refer to like elements.

DESCRIPTION OF THE EMBODIMENTS

Droplet Discharging Device

Figure 1:
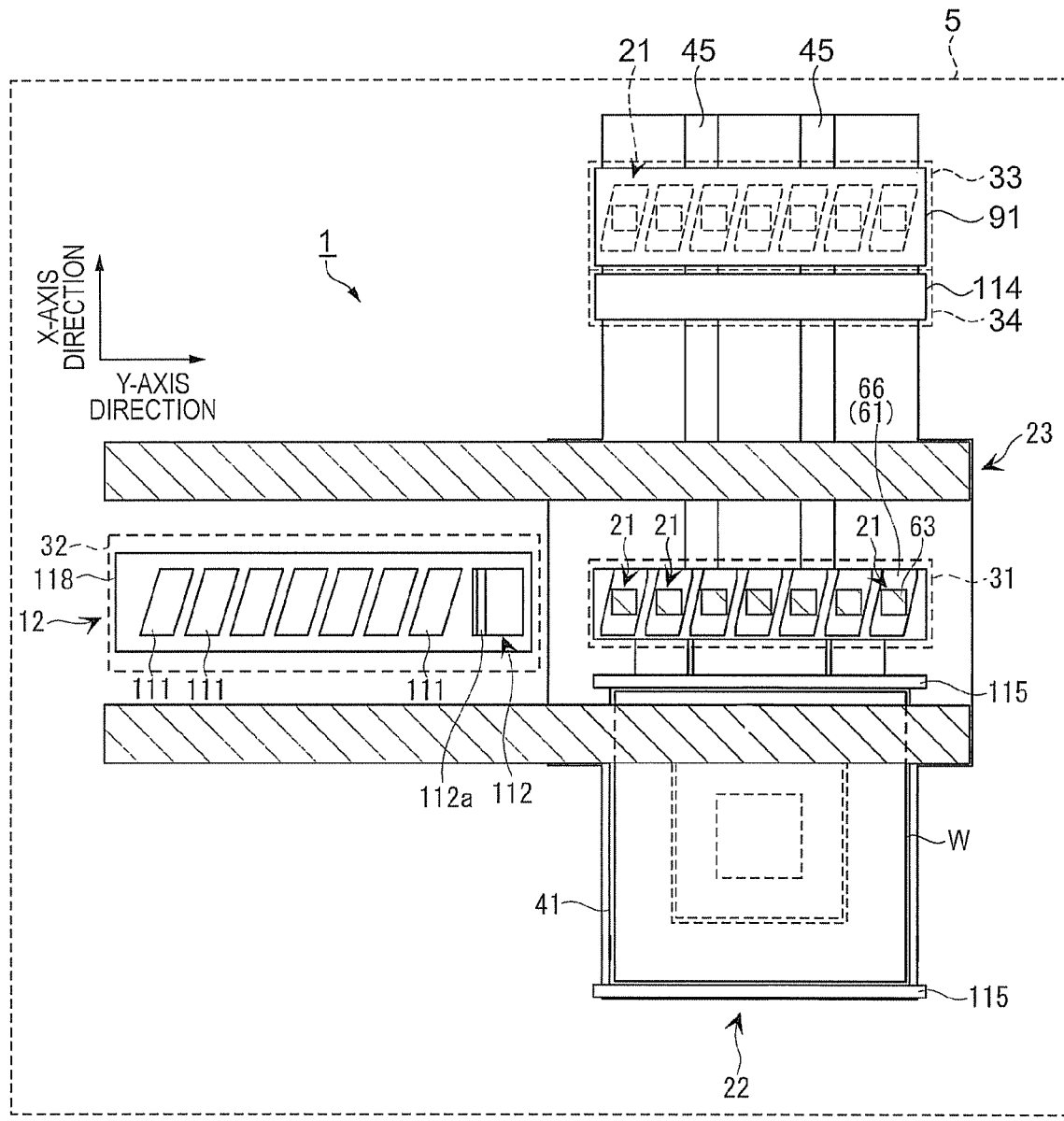
FIG. 1 is a schematic plan view showing a structure of a droplet discharging device of an embodiment of the invention.
Figure 2:
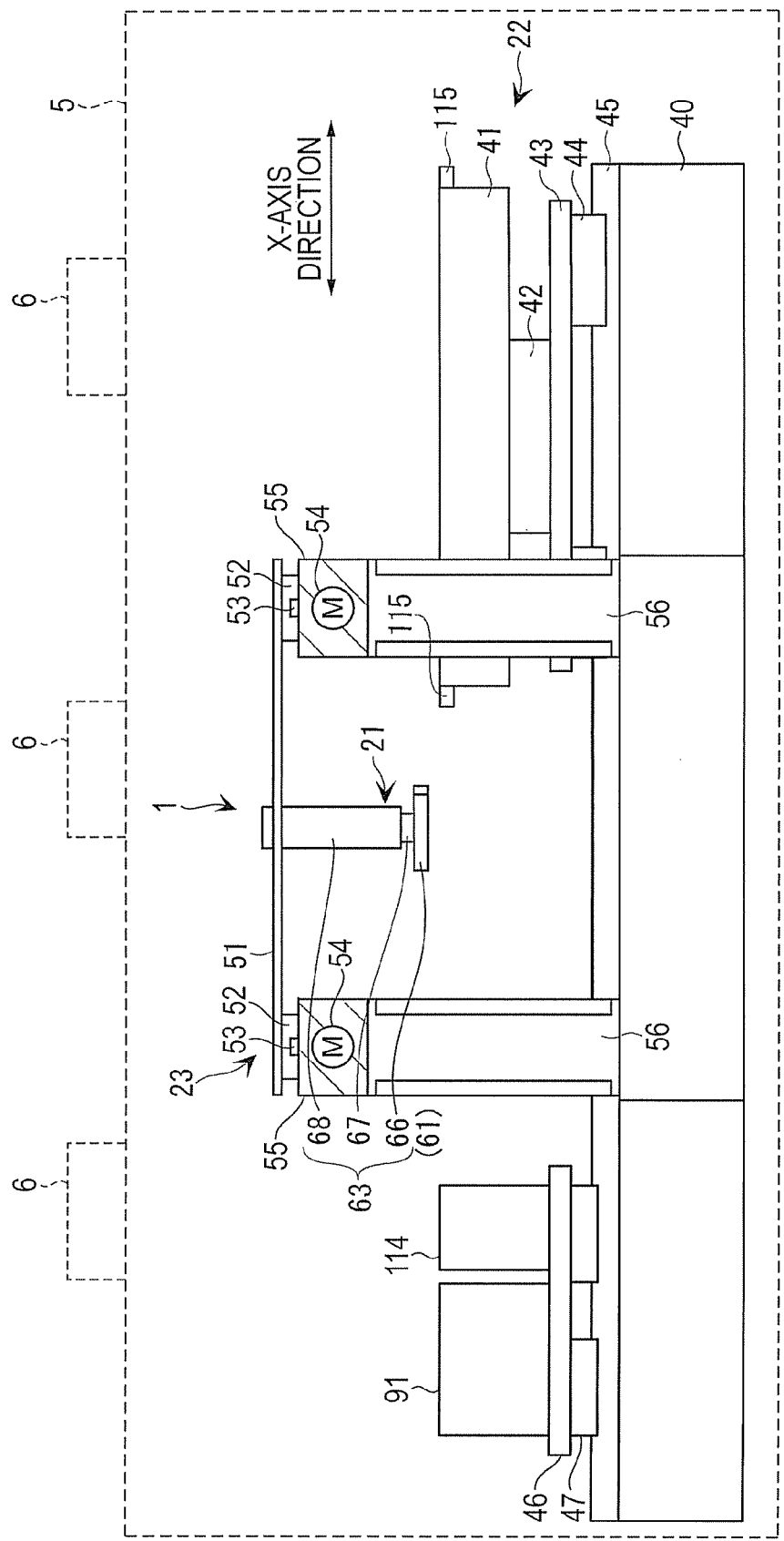
FIG. 2 is a schematic side view showing the structure of the droplet discharging device of the embodiment of the invention.

Firstly, the droplet discharging device of the present embodiment will be explained with reference to FIGS. 1 through 6. FIG. 1 is a schematic plan view showing a structure of the droplet discharging device, and FIG. 2 is a schematic side view showing the structure of the droplet discharging device.

As shown in FIG. 1, the droplet discharging device 1 of the present embodiment is provided with an X-axis table 22 as a main-scanning motion mechanism for moving an absorption table 41 for mounting a substrate W as a work, and a Y-axis table 23 as a sub-scanning motion mechanism for moving a plurality of (seven) carriage units 21 as carriages independently from each other above the X-axis table 22.

Each of the carriage units 21 arranged in the Y-axis direction is provided with a head unit 61 mounting a plurality of droplet discharging heads 62 (see FIGS. 3A and 3B) as a plurality of discharging heads for discharging a liquid as droplets, and a main carriage 63 for suspending a carriage main body 66 including the head unit 61.

Further, the X-axis table 22 is provided with a weighing mechanism 91 for receiving the liquid discharged from each of the droplet discharging heads 62 mounted on the head unit 61 and measuring the weight of the liquid for each of the droplet discharging heads 62, and a flashing box 114 as a flashing section disposed in parallel to the weighing mechanism and on the side of the absorption table 41. In this case, it is arranged that the weighing mechanism 91 and the flashing box 114 can be moved integrally in the X-axis direction by the X-axis table 22.

The weighing mechanism 91 is disposed in the Y-axis direction along a drawing area 31 in which drawing can be performed with the plurality of droplet discharging heads 62 mounted on the plurality of carriage units 21. When the weight measurement is performed, each of the carriage units 21 is disposed in a weighing area 33 while each of the carriage units 21 keeps an arrangement state in the drawing area 31.

At a position out of the X-axis table in the Y-axis direction, there is provided a maintenance mechanism 12 for performing maintenance of the droplet discharging head 62. The Y-axis table 23 is extended perpendicular to the X-axis table 22, and moves the plurality of carriage units 21 arranged in the drawing area 31 to the maintenance area 32 in which the maintenance mechanism 12 is disposed.

The maintenance mechanism 12 is provided with suction units 111 for suctioning and removing the liquid increasing in viscosity inside the droplet discharging heads 62, and a wiping unit 112 for wiping out the liquid and foreign matters, which are attached on the surfaces (nozzle surfaces) of the droplet discharging heads 62 by the suctioning and removing operation and so on, using a wiping sheet 112a.

The suction units 111 are disposed side-by-side in the Y-axis direction corresponding to the plurality of (seven) carriage units 21. The suction units 111 and the wiping unit 112 are disposed on an angle stage 118.

The maintenance mechanism 12 is a device for recovering the discharging function of the plurality of droplet discharging heads 62 mounted on the plurality of head units 61 from nozzle clogging and so on using the suction units 111 and the wiping unit 112 described above.

FIG. 2 is a schematic side view showing the structure of the droplet discharging device. In detail, it is a side view viewed from the side of the maintenance mechanism 12.

The X-axis table 22 is provided with a base 40, a pair of X-axis guide rails 45 disposed on the base 40 and a pair of X-axis linear motors (not shown) disposed in parallel with the pair of X-axis guide rails 45. Further, it is provided with X-axis sliders 44, 47 slidably moved in the X-axis direction by the X-axis linear motors while guided by the pair of X-axis guide rails 45, a table support section 43 supported by the X-axis slider 44, and a weighing mechanism support section 46 supported by the X-axis slider 47.

The table support section 43 is provided with the absorption table 41 for absorbing (air suction) and setting the substrate W and a θ-axis table 42 for fine-tuning the θ position of the substrate W via the absorption table 41 disposed thereon. When the pair of X-axis linear motors is driven, the X-axis slider 44 guided by the pair of X-axis guide rails 45 moves in the X-axis direction, thus the substrate W set in the absorption table 41 can be moved in the X-axis direction.

Further, although not shown in the drawings, the absorption table 41 is provided with a pair of X-axis distance-narrowing mechanisms in the X-axis direction and a pair of Y-axis distance-narrowing mechanisms in the Y-axis direction, so as to position (perform pre-alignment of) the substrate W set thereon. The substrate W thus set thereon is finally positioned using image recognition by a work recognition camera (not shown) provided, for example, to the Y-axis table 23.

The weighing mechanism support section 46 is provided with the weighing mechanism 91 and the flashing box 114 disposed thereon in parallel with each other. When the pair of X-axis linear motors is driven, the X-axis slider 47 guided by the pair of X-axis guide rails 45 moves in the X-axis direction, thus the weighing mechanism 91 and the flashing box 114 can be moved to a position adjacent to the head units 61. In other words, the plurality of head units 61 (the carriage units 21) can be disposed in the weighing area 33 or the flashing area 34 while maintaining the arrangement of the plurality of head units 61.

As shown in FIGS. 1 and 2, in order for stabilizing the discharging function of the droplet discharging head 62, the X-axis table 22 is provided with two pre-drawing flashing boxes 115 disposed on the both ends of the absorption table 41 in the X-axis direction besides the flashing box 114 provided so as to correspond to the plurality of carriage units 21 arranged in the Y-axis direction.

As shown in FIG. 2, the weighing mechanism 91 and the flashing box 114 are disposed on the weighing mechanism support section 46 so that the upper surfaces thereof become substantially the same level as the upper surface of the absorption table 41. Similarly, the pre-drawing flashing boxes 115 are also provided to the absorption table 41 so that the upper surfaces thereof become substantially the same level as the upper surface of the absorption table 41.

By performing the flashing operation in which the liquid is discharged from all of the nozzles 85 (see FIG. 3) of the droplet discharging heads 62 to the flashing box 114 or the pre-drawing flashing boxes 115 periodically or prior to drawing, the meniscus of the liquid in each of the nozzles 85 is stabilized.

Meanwhile, the Y-axis table 23 is provided with a pair of support stands 56 stood from the base 40, a pair of columnar support members 55 bridged over the pair of support stands 56, and a pair of Y-axis linear motors 54 disposed in conjunction with the pair of columnar support members 55. On the pair of columnar support members 55, there are provided a pair of Y-axis guide rails 53 and Y-axis sliders 52 slidably moved in the Y-axis direction by the Y-axis linear motors 54 while guided by the pair of Y-axis guide rails 53.

A plurality of the Y-axis sliders 52 is provided corresponding to the carriage units 21, and supports bridge plates 51 from which the main carriages 63 are suspended. In other words, the seven bridge plates 51 are each supported by the independent Y-axis slider 52.

When the Y-axis linear motors 54 are driven, the Y-axis slider 52 guided by the pair of Y-axis guide rails 53 is moved in the Y-axis direction, thus the main carriage 63 suspended from the bridge plate 51 can be moved in the Y-axis direction.

The main carriage 63 includes a carriage main body 66 for supporting the head unit 61, a head θ-axis table 67 suspending the carriage main body 66 and connected to an upper part of the carriage main body 66 so as to be capable of fine-tuning the θ position of the head unit 61 by the motor drive via the carriage main body 66, and a head Z-axis table 68 connected to an upper part of the head θ-axis table 67 so as to be able to fine-tune the position of the head unit 61 in the Z-axis direction by the motor drive via the head θ-axis table 67 and the carriage main body 66.

The droplet discharging device 1 as described above is housed in a chamber 5 provided with HEPA units 6 disposed on the upper part thereof, and is used in the condition in which the inside thereof is air-conditioned to keep a predetermined cleanliness class, temperature, and moisture.

Figure 3A:
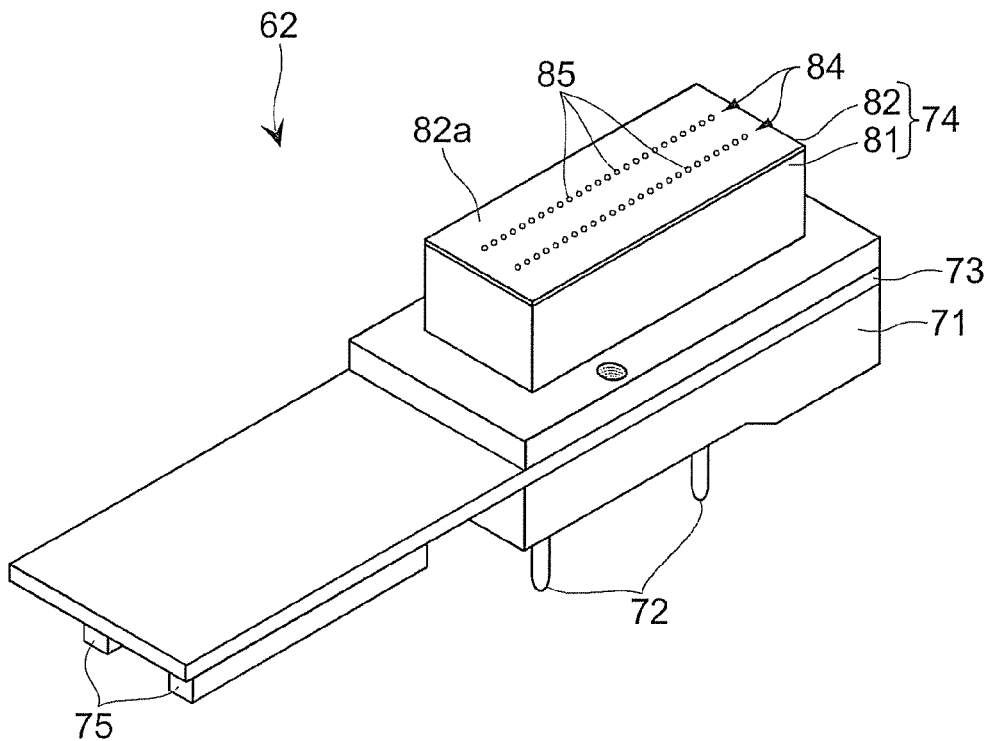
FIG. 3A is a schematic perspective view showing a droplet discharging head of the embodiment of the invention.
Figure 3B:
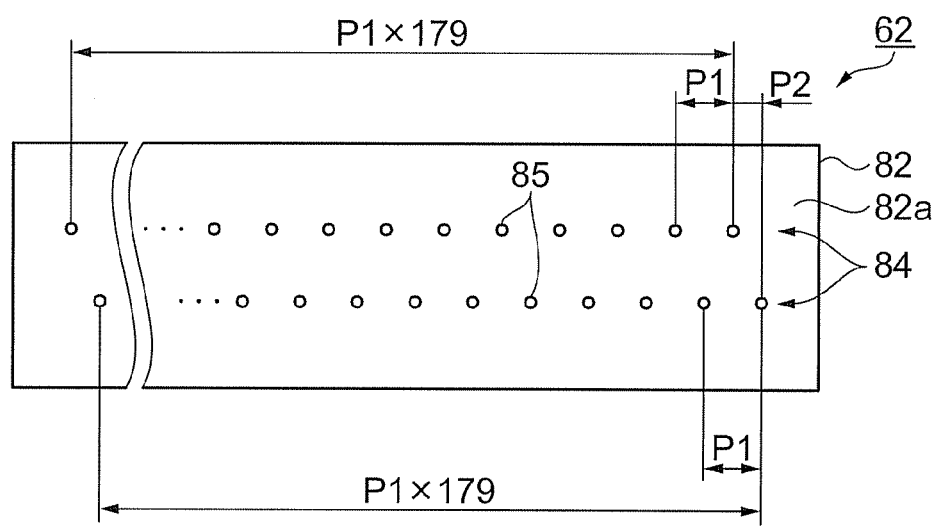
FIG. 3B is a schematic plan view showing a nozzle plate of the embodiment of the invention.

FIGS. 3A and 3B are schematic diagrams showing the droplet discharging head. FIG. 3A is a perspective view, and FIG. 3B is a plan view showing a nozzle plate.

As shown in FIG. 3A, the droplet discharging head 62 is a so-called double line type, and is provided with a liquid lead-in section 71 having double connection needles 72, a head substrate 73 contiguous to the liquid lead-in section 71, and a head main body 74 connected contiguously above the liquid lead-in section 71 and having an in-head channel filled with the liquid formed inside thereof. The connection needles 72 are connected to a tank retaining the liquid via a pressure regulator valve, thus supplying the in-head channel of the droplet discharging head 62 with the liquid. Further, the head main body 74 includes a cavity 81 composed of a piezoelectric element or the like and a nozzle plate 82 having two nozzle lines 84 composed of a plurality of nozzles 85 provided to a nozzle surface 82a. Further, the head substrate 73 is provided with double connectors 75 each connected to a head driver 131 (see FIG. 6) via a flexible flat cable. The head driver 131 applies a drive voltage to the piezoelectric element to vary the volume of the cavity 81. Thus, the liquid filling the cavity 81 is pressurized to be discharged from the nozzles 85 as droplets.

As shown in FIG. 3B, the length of each of the nozzle lines 84 is, for example, one inch (approximately 25.4 mm), and each of the nozzle lines 84 is composed of 180 nozzles 85 arranged in a constant pitch P1 (approximately 140 µm). In this case, one of the nozzle lines 84 is disposed a half pitch (70 µm) shifted from the other of the nozzle lines 84 in the nozzle line direction. Therefore, when viewed from a direction perpendicular to the nozzle line direction, there is observed the condition in which the 360 nozzles 85 are arranged in a nozzle pitch of P2 (70 µm). In this case, the dot density (resolution) of the droplets discharged from the two nozzle lines 84 is 360 dpi.

The droplet discharging head 62 described above is not limited to what is equipped with the piezoelectric element, but can be what is provided with an electromechanical transducer element for vibrating a diaphragm by electrostatically absorbing the diaphragm or with a heater element for heating the liquid as energy generation means for pressurizing the liquid.

Figure 4:
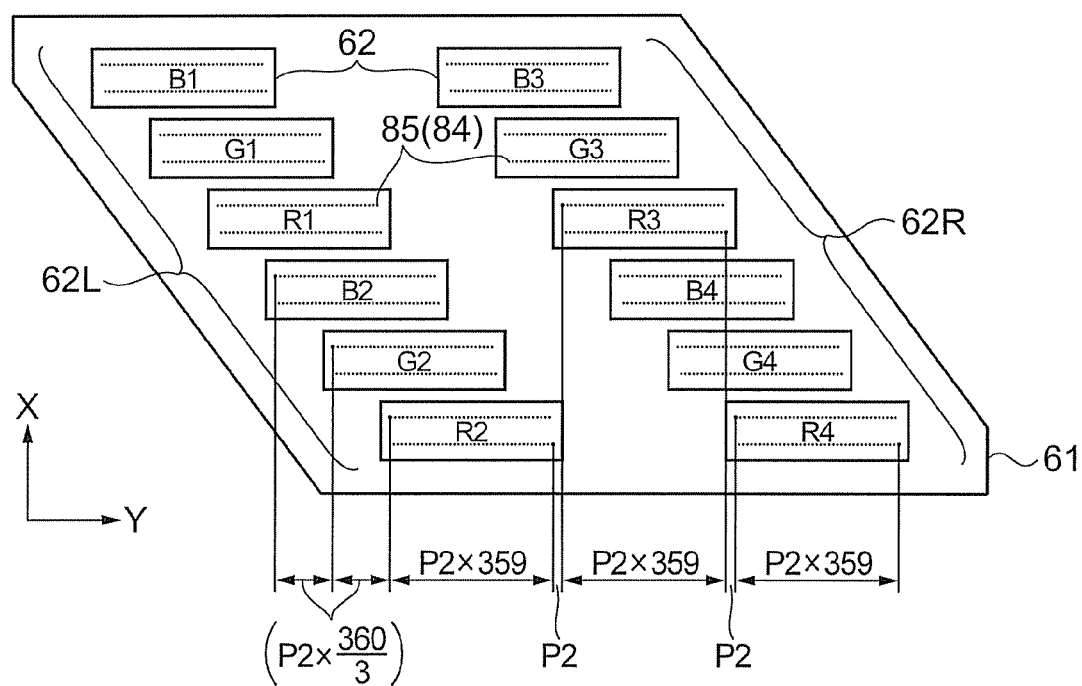
FIG. 4 is a schematic plan view showing an arrangement of the droplet discharging heads of the embodiment of the invention.

FIG. 4 is a schematic plan view showing an arrangement of the droplet discharging heads of the embodiment of the invention. For details, it is a plan view viewed from the side of the X-axis table 22.

As shown in FIG. 4, the head unit 61 is provided with totally twelve droplet discharging heads 62 mounted thereon. There are configured two head groups 62L, 62R each having six droplet discharging heads 62 arranged stepwise viewed from the X-axis direction. Each of the head groups 62L, 62R has three kinds of droplet discharging heads 62 filled with liquids respectively including red (R), green (G), and blue (B) colored layer forming materials arranged in an RGB order.

Further, for example, the nozzle lines 84 of the heads R1, R2, R3, and R4 filled with the liquid of red (R) are arranged with intervals of one nozzle pitch P2 viewed from the X-axis direction. The same applies to other colors, green (G) and blue (B). Further, in the heads R2 and G2 or the heads G2 and B2 filled with the liquids of different colors from each other, the nozzle lines 84 are arranged in the condition of being shifted as much as a third of the entire length of the nozzle lines 84 from one another in the Y-axis direction.

Therefore, a so-called drawing width in which the same color liquid can be discharged continuously in the Y-axis direction, in this case, makes (P2'359×4)+(P2×3)=100730 μm, approximately 100 mm.

Figure 5A:
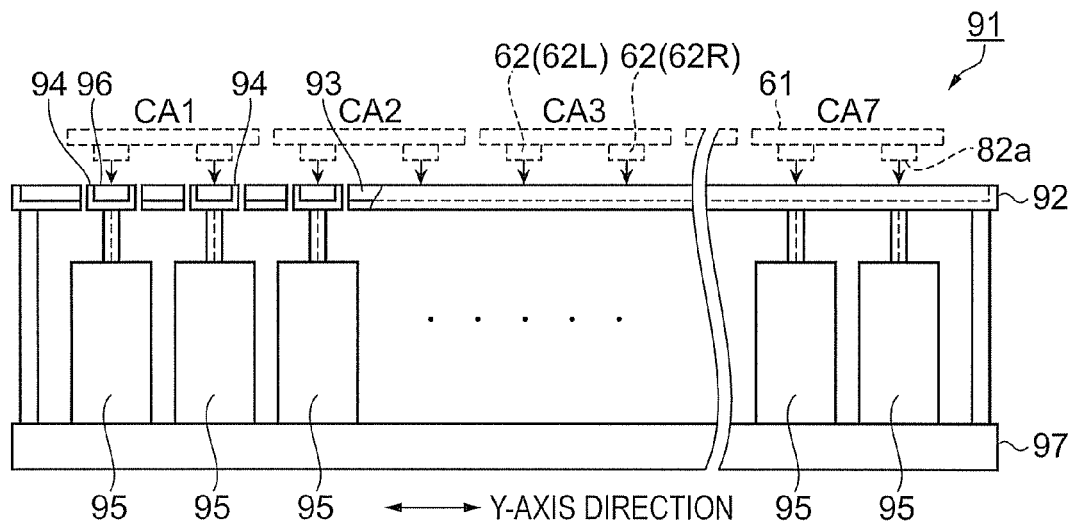
FIG. 5A is a schematic side view showing a weighing mechanism of the embodiment of the invention.

Hereinafter, the weighing mechanism 91 will be explained with reference to FIGS. 5A and 5B. FIG. 5A is a schematic side view showing a weighing mechanism of the embodiment of the invention while FIG. 5B is a schematic plan view thereof.

Figure 5B:
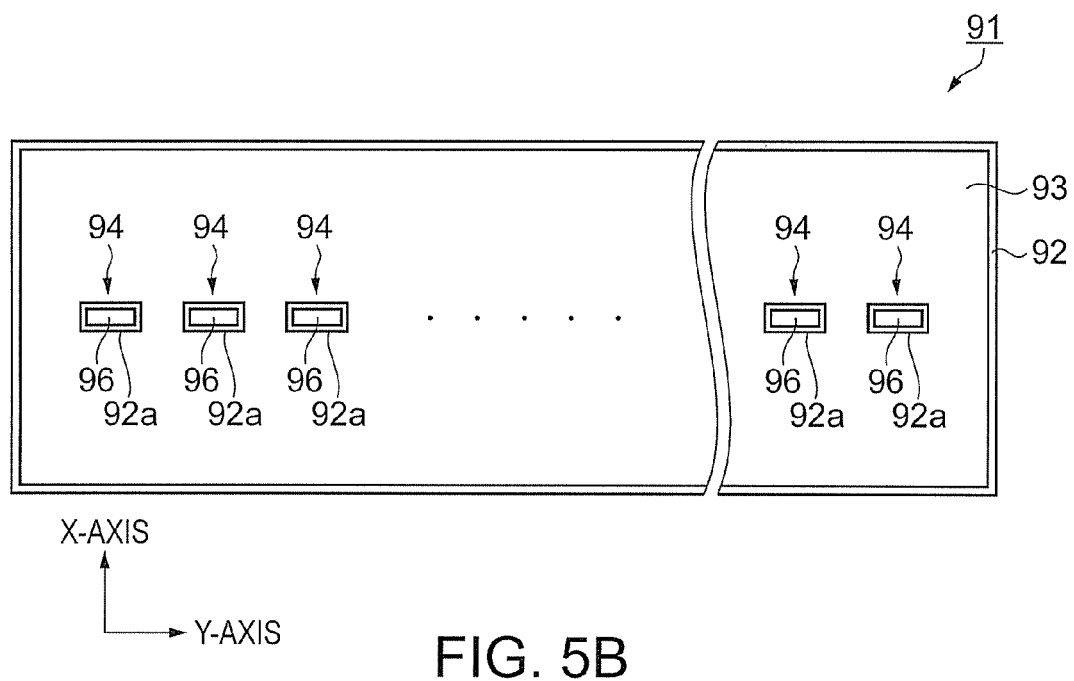
FIG. 5B is a schematic plan view of the weighing mechanism.

As shown in FIGS. 5A and 5B, the weighing mechanism 91 is provided with electronic balances 95 as 14 weighing devices disposed on a support plate 97, first droplet receiving sections 94 respectively provided to the electronic balances 95, and a second droplet receiving section 92. The electronic balance 95 is arranged to be able to measure the weight of the liquid discharged to the first droplet receiving section 94.

The first droplet receiving section 94 is shaped like a tray, and provided with an absorber 96 laid thereon for absorbing the liquid discharged thereto.

The second droplet receiving section 92 has a tray-like shape supported by pole braces stood from four corners of the support plate 97. Further, as shown in FIG. 5B, it is provided with opening sections 92a surrounding the respective first droplet receiving sections 94. Further, similarly to the above, an absorber 93 is laid thereon so as to surround the first droplet receiving sections 94. The absorber 93 is laid thereon so that the upper surface thereof becomes substantially the same level as the upper surfaces of the absorbers 96. As such absorbers 93, 96, porous foamed plastic is used, for example.

The first droplet receiving sections 94 and the second droplet receiving section 92 as described above are designed based on the arrangement of the droplet discharging heads 62 mounted on the head units 61 respectively facing these receiving sections. In other words, the size (planar dimension) of the first droplet receiving section 94 shown in FIG. 5B is arranged to be large enough for sufficiently facing the nozzle surface 82a of the droplet discharging head 62. Further, the size (planar dimension) of the second droplet receiving section 92 is designed so that when the seven head units 61 (the carriage units CA1 through CA7) and the weighing mechanism 91 are relatively disposed with the droplet discharging heads 62 as measuring objects and the first droplet receiving sections 94 facing each other, the droplet discharging heads 62 other than the measuring objects and the second droplet receiving section 92 inevitably face each other.

Figure 6:
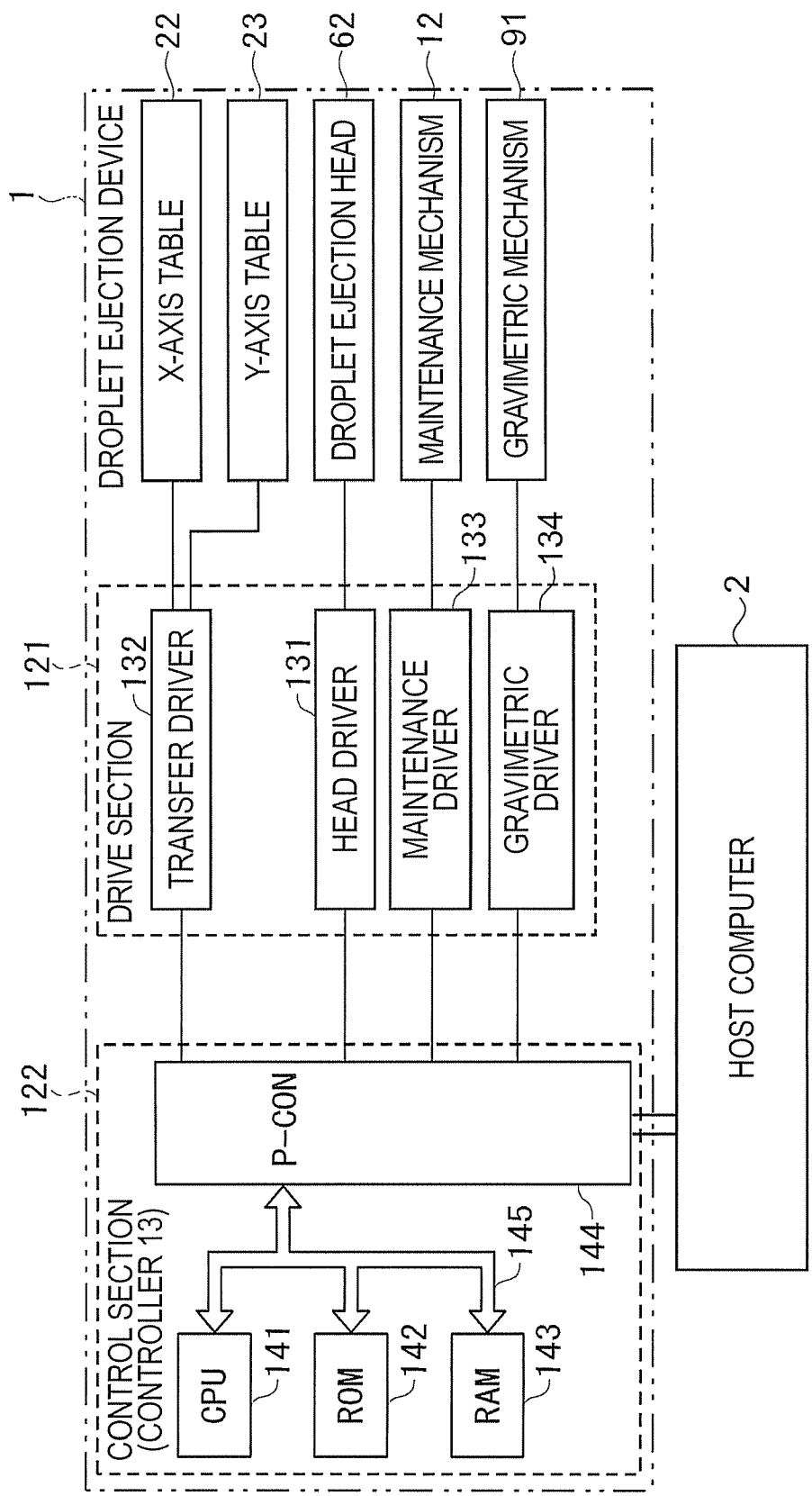
FIG. 6 is a block diagram showing a control system of the droplet discharging device of the embodiment of the invention.

Hereinafter, the control system of the entire droplet discharging device 1 will be explained with reference to FIG. 6. FIG. 6 is a block diagram showing a control system of the droplet discharging device of the embodiment of the invention. As shown in FIG. 6, the control system of the droplet discharging device 1 is basically provided with a host computer 2, a drive section 121 having various drivers for driving the droplet discharging heads 62, the X-axis table 22, the Y-axis table 23, the maintenance mechanism 12, the weighing mechanism 91, and so on, and a control section 122 (a controller 13) for performing overall control of the entire droplet discharging device 1 including the drive section 121.

The host computer 2 is configured by connecting a keyboard, a display for displaying an input result by the keyboard and so on as an image, and so on to the computer main body connected to the controller 13.

The drive section 121 is provided with a head driver 131 for performing discharging drive control of the droplet discharging heads 62, a motion driver 132 for performing drive control of the linear motors of the X-axis table 22 and the Y-axis table 23, a maintenance driver 133 for performing drive control of a suction unit 111, a wiping unit 112, and a unit elevating mechanism of the maintenance mechanism 12, and a weighing driver 134 for controlling the electronic balances 95 of the weighing mechanism 91.

The control section 122 is provided with a CPU 141, a ROM 142, a RAM 143, and a P-CON 144, which are connected to each other via a bus 145. The ROM 142 has a control program area for storing a control program and so on processed in the CPU 141 and a control data area for storing control data and so on for performing the drawing operation and the weight measurement.

The RAM 143 has various kinds of storage sections such as a drawing data storage section for storing drawing data for performing discharging of the liquid to the substrate W, or a position data storage section for storing design position data of the substrate W and the head units 61 in addition to various kinds of register groups, and is used as various kinds of work area for control processing. It should be noted that the design position data of the head units 61 denotes the position data stored right before the drawing processing, and is a concept including the updated position data of the head units 61 besides the position data when the droplet discharging device 1 is designed (newly-created).

In addition to the various kinds of drivers in the drive section 121, a camera for recognizing the position of the substrate W and so on are connected to the P-CON 144, and a logic circuit for compensating the function of the CPU 141 and for handling the interface signals with peripheral circuits is configured and built-in in the P-CON 144. Therefore, the P-CON 144 takes various kinds of instructions from the host computer 2 in the bus 145 directly or with modification, and in conjunction with the CPU 141, the P-CON 144 outputs the data and the control signals, which are output to the bus 145 from the CPU 141 and so on, to the drive section 121 directly or with modification.

Further, along the control program in the ROM 142, the CPU 141 inputs various kinds of detection signals, various kinds of commands, various kinds of data, and so on via the P-CON 144, processes the various kinds of data and so on in the RAM 143, and then outputs various kinds of control signals to the drive section 121 and so on via the P-CON 144, thereby controlling the entire droplet discharging device 1. For example, the CPU 141 controls the droplet discharging heads 62, the X-axis table 22, and the Y-axis table 23 to perform drawing by discharging the liquid from the droplet discharging heads 62 to the substrate W as droplets in a predetermined droplet discharging condition and a predetermined motion condition.

Further, the CPU 141 controls the X-axis table 22 to move the weighing mechanism 91 to dispose the plurality of carriage units 21 in the weighing area 33, and makes the droplet discharging heads 62 mounted on the head units 61 emit the liquid to the first droplet receiving sections 94 as droplets. Then, the amount of discharging of the droplets is calculated based on the weight of the liquid measured by the electronic balances 95. The drive voltage for driving the piezoelectric elements of each of the droplet discharging heads 62 are controlled based on the calculation results, thus the droplets of an appropriate amount are discharged. More specific method of measuring weight and method of discharging the liquid will be explained later.

The arrangement of the weighing mechanism 91 in the droplet discharging device 1 as described above is determined considering that the environmental condition and the drive condition of the droplet election head 62 when the plurality of carriage units 21 arranged in the drawing area 31 performs drawing by discharging the liquid can be substantially the same as the environmental condition and the drive condition when the plurality of carriage units 21 is arranged in the weighing area 33 and the liquid is discharged from the droplet discharging heads 62 as the measuring objects.

Then, a method of measuring weight and a method of discharging the liquid according to the present embodiment will be explained taking a method of manufacturing a color filter having a colored layer of a plurality of colors as an example.

Figure 7:
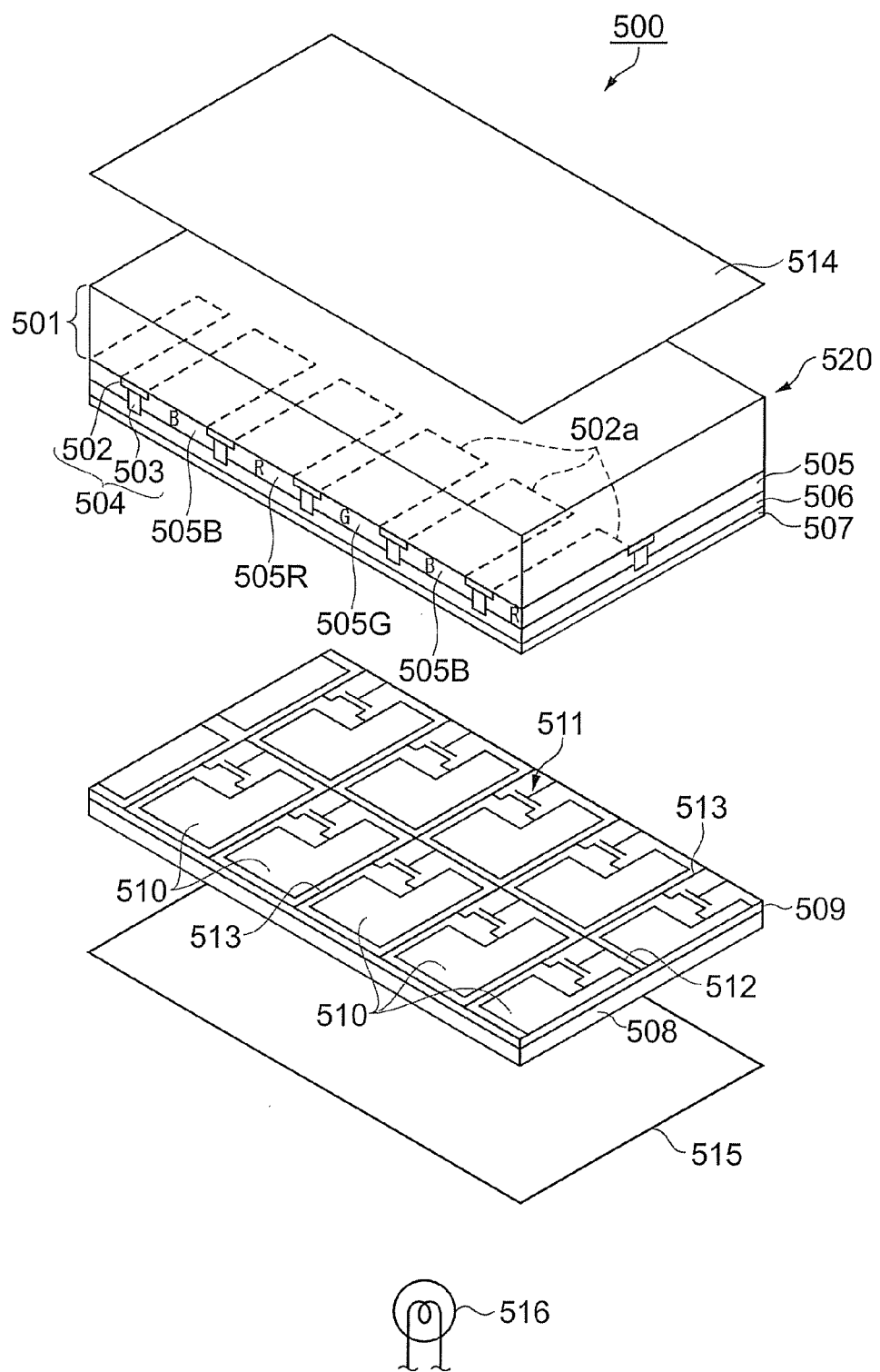
FIG. 7 is a schematic exploded perspective view showing a structure of a liquid crystal display device of the embodiment of the invention.

Firstly, a liquid crystal display device as one of the electro-optic devices using a color filter will be explained. FIG. 7 is a schematic exploded perspective view showing a structure of a liquid crystal display device.

As shown in FIG. 7, the liquid crystal display device 500 is provided with a thin film transistor (TFT) transmissive liquid crystal panel 520 and a lighting device 516 for lighting the liquid crystal display panel 520. The liquid crystal display panel 520 is provided with an opposed substrate 501 having a color filter 505 as the colored layer, an element substrate 508 having TFT elements 511 one of three terminals of which is connected to one of the pixel electrodes 510, and the liquid crystal (not shown) held between the both substrates 501, 508. Further, the surfaces of the both substrates 501, 508 forming the outer surfaces of the liquid crystal display panel 520 are provided with an upper polarization plate 514 and a lower polarization plate 515 disposed thereon for polarizing the light transmitted therethrough.

The opposed substrate 501 is made of a transparent material such as glass, and has the color filters 505R, 505G, and 505B of three colors RGB as the colored layer of a plurality of colors formed as stripes in a plurality of colored areas partitioned in a matrix with partition section 504 on the side of the surface holding the liquid crystal. The partition section 504 is composed of a lower layer bank 502 called a black matrix and made of metal having a light-blocking property such as Cr or of the oxide film thereof, and an upper layer bank 503 made of organic compound and formed on (downward in the drawing) the lower layer bank 502. Further, the opposed substrate 501 is provided with an overcoat layer (OC layer) 506 as a planarizing layer for covering the partition section 504 and the color filters 505R, 505G, and 505B, and an opposed electrode 507 made of transparent conductive film such as indium tin oxide (ITO) formed to cover the OC layer 506. The color filters 505R, 505G, and 505B are manufactured using a method of manufacturing the color filter described later.

The element substrate 508 is similarly made of a transparent material such as glass, and provided with pixel electrodes 510 formed in a matrix on the side of the surface holding the liquid crystal via an insulating film 509, and a plurality of TFT elements 511 formed corresponding to the pixel electrodes 510. Two terminals out of the three terminals of the TFT element 511, which are not connected to the pixel electrode 510, are respectively connected to a scan line 512 and a data line 513 disposed so as to surround the pixel electrode 510 while being insulated from each other.

The lighting device 516 is not particularly limited providing it uses white LED, white EL, or white cold-cathode tube as a light source and is equipped with a configuration capable of emitting the light from the light source towards the liquid crystal display panel 520 such as a light guide plate, a diffusing plate, or reflecting plate.

It should be noted that although the surfaces of the opposed substrate 501 and the element substrate 508 holding the liquid crystal therebetween are each provided with an oriented film for arranging the molecules of the liquid crystal in a predetermined direction, the oriented films are omitted from the drawings. Further, the upper and lower polarization films 514, 515 can be what is combined with an optical functional film such as a retardation film used for the purpose of improving the view angle dependency. The liquid crystal display panel 520 is not limited to what is provided with a TFT element as the active element, but can be what is provided with a thin film diode (TFD) element instead, and further, can be a passive-type liquid crystal display device having the electrodes for forming the pixels disposed so as to intersect with each other providing it has a color filter on at least one of the substrates.

Method of Manufacture of Color Filter

Figure 8:
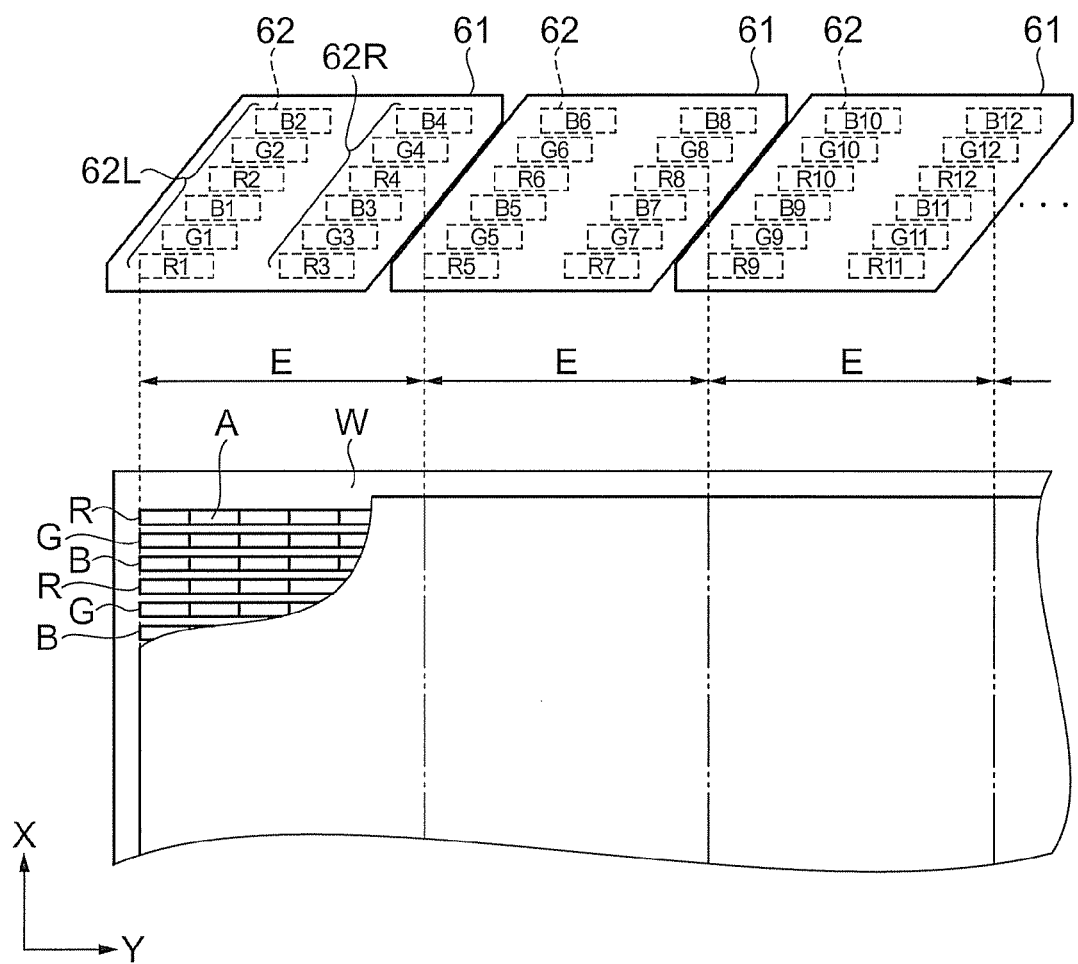
FIG. 8 is a schematic diagram showing a method of manufacturing a color filter of an embodiment of the invention.

FIG. 8 is a schematic diagram showing a method of manufacturing a color filter of an embodiment of the invention. In the method of manufacturing the color filter according to the present embodiment, the droplet discharging device 1 described above is used, and a method of discharging the liquid described later is adopted. It should be noted that in FIG. 8 the width of each of the droplet discharging heads 62 in the Y-axis direction illustrated with broken lines denotes the width of the area to which the liquid can be discharged from an effective nozzle.

As shown in FIG. 8, in the droplet discharging device 1 described above, the substrate W is set on the absorption table 41 to be positioned so that the stripe direction of the colored area A of three colors RGB becomes parallel with respect to the plurality of head units 61 arranged in the Y-axis direction.

For example, the positioning is performed so as to align an edge of the head R1 of the head unit 61 in the Y-axis direction with an edge of the colored area A of red (R) of the substrate W.

Then, the X-axis table 22 is driven, and while the substrate W is moved relatively to the plurality of head units 61 in the X-axis direction, the liquids including the colored layer forming materials are discharged from the respective droplet discharging heads 62 mounted on the each of the head units 61 as droplets.

As described above, each of the head units 61 is provided with four droplet discharging heads 62 for discharging the liquid of the same color arranged in the Y-axis direction when viewed from the X-axis direction. Therefore, by arranging the head units 61 in the drawing area 31 so that the drawing ranges E in which the liquid of the same color can be discharged in the Y-axis direction are contiguous, the liquid of the same color can be provided in accordance with the width of the substrate W without creating a gap therebetween. Obviously, around the end of the colored area A, the is caused an area in which the colored area A corresponding to the colors other than red (R), namely green (G) or blue (B), is not provided with the liquid. Therefore, by performing a sub-scanning operation for moving the plurality of head units 61 in the Y-axis direction and then performing again a main-scanning operation for discharging droplets, the liquid of the desired color can be provided to the entire colored area A.

Method of Discharging of Liquid

Figure 9:
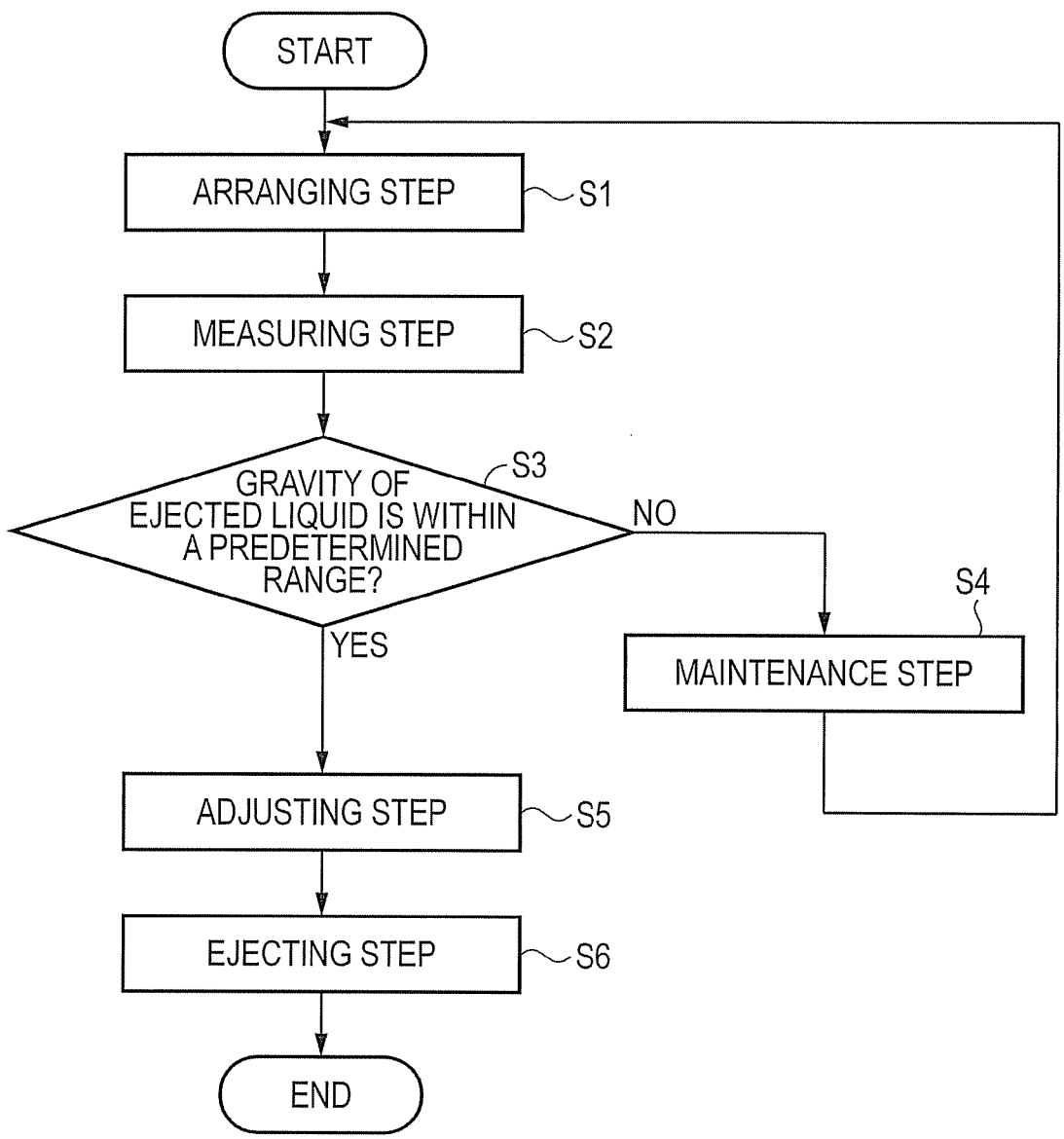
FIG. 9 is a flowchart showing a method of discharging a liquid.

Hereinafter, a method of discharging the liquid applying the method of measuring weight according to the present invention will be explained with reference to FIG. 9. FIG. 9 is a flowchart showing the method of discharging the liquid.

As shown in FIG. 9, the method of discharging the liquid according to the present embodiment includes an arranging step (step S1) of disposing the plurality of carriage units 21 and the weighing mechanism 91 so as to face each other, a measuring step (step S2) of measuring the weight of the liquid discharged from each of the droplet discharging heads 62, a judging step (step S3) of judging about the weight of the liquid thus discharged, and a maintenance step (step S4). The steps hereinabove correspond to the method of measuring weight according to the present embodiment. Further, it includes an adjusting step (step S5) of adjusting the amount of discharging of the droplets discharged from each of the droplet discharging heads 62, and an discharging step (step S6) as the drawing step of drawing by discharging the liquid including the colored layer forming material from each of the droplet discharging head 62 to the colored area A of the substrate W as a work.

The step S1 shown in FIG. 9 is the arranging step. In the step S1, the control section 122 drives the X-axis linear motor to move the weighing mechanism support section 46 so that the weighing mechanism 91 becomes adjacent to a plurality of carriage units 21. Thus, the plurality of carriage units 21 is disposed in a weighing area 33 while each of the carriage units 21 keeps an arrangement state in the drawing area 31. Then, the process proceeds to the step S2.

The step S2 shown in FIG. 9 is the measuring step. In the step S2, the control section 122 performs weight measurement based on the control program and the control data stored in the ROM 142. Firstly, the weight of the first droplet receiving section 94 before receiving the liquid is measured. It is possible to reset the electronic balance 95 at this moment assuming that the weight is "zero." Subsequently, a predetermined number of discharging of droplets are discharged from the droplet discharging head 62 as the measuring object to the first droplet receiving section 94. The setting of the number of discharging is included in the control data taking the minimum measurement unit of the electronic balance 95 into consideration. In this case, the minimum measurement unit of the electronic balance is 1 mg. On the other hand, since the scale of the weight of the discharged droplet is ng, the number of times of discharging is set to several through ten thousands for driving the droplet discharging head 62, thus discharging the liquid from each of the nozzles 85 as the droplets.

In the measuring step of the present embodiment, the weight of the discharged liquid is measured for every nozzle line 84. This is because as shown in FIG. 3, the droplet discharging head 62 is provided with the double nozzle lines 84 and the double connection needles 72 corresponding thereto, and further it has a separated common channel of the liquid inside the head main body 74 for each of the nozzle lines 84. Therefore, variation in the amount of discharging of the liquid for each of the nozzle lines 84 caused by the difference between the common channels of the liquid is considered. Accordingly, discharging of the liquid from the one of the nozzle lines 84 is performed for measurement to measure the weight of the first droplet receiving section 94, and the measurement result is stored in the RAM 143 of the control section 122. After then, discharging of the liquid from the other of the nozzle lines 84 is performed for measurement to measure the weight, and the measurement result is similarly stored in the RAM 143. It should be noted that the number of dischargings is obtained by multiplying the number of nozzles 180 by the number of times of discharging.

Further, in the measuring step, the droplets are simultaneously discharged from the droplet discharging heads 62, which are not the measuring object, towards the second droplet receiving section 92. Thus, the droplet discharging condition can previously be stabilized in preparation for the weight measurement. The operation described above is repeated corresponding to all of the droplet discharging heads 62 mounted on the carriage unit 21.

In this case, as shown in FIG. 5, the weighing mechanism 91 is provided with two first droplet receiving sections 94 disposed corresponding to every carriage unit 21. Therefore, the weight measurement is performed at least 12 times corresponding to the double nozzle lines 84. By moving the plurality of carriage units 21 and the weighing mechanism 91 relatively to each other, the control section 122 selects the droplet discharging head 62 of the measuring object to make it face the first droplet receiving section 94 and eject the droplets. Further, in this case, it is preferable to drive the head Z-axis table 68 of each of the carriage units 21 (illustrated as the carriage units CA1 through CA7 in the drawing) to adjust the distance between the nozzle surface 82a of the droplet discharging head 62 and the upper surface of the absorber 96 to be in a range of about 0.5 mm through 1.0 mm so as to prevent the discharged droplets from scattering outside the first droplet receiving section 94. Then, the process proceeds to the step S3.

The step S3 shown in FIG. 9 is the judging step. In the step S3, the weight of the liquid discharged by every nozzle line 84 of each of the droplet discharging heads 62 obtained in the measuring step and the desired weight of the liquid to be discharged from the nozzle line 84 are compared, and whether or not the difference is within a predetermined range is judged. As shown in FIG. 3, 180 nozzles 85 are arranged in one nozzle line 84, and if some of them fail to eject droplets because of clogging or have variations in amount of discharging of the droplets, the accurate measurement of the weight of the liquid reflecting the case of actual drawing by discharging becomes difficult. Therefore, if the difference is out of the predetermined range, the process proceeds to the maintenance step of the step S4, and the maintenance process of each of the droplet discharging heads 62 is performed. Specifically, the control section 122 drives the Y-axis table 23 to move each of the carriage units 21 to the maintenance area 32, and drives the suction unit 111 and the wiping unit 112 to recover the discharging function of each of the droplet discharging heads 62 mounted on the head unit 61.

After finishing the maintenance step of the step S4, the steps S1 through S3 are performed again. If no problem is detected in the step S3, the process proceeds to the step S5.

The step S5 shown in FIG. 9 is the adjusting step. In the step S5, firstly, the amount of discharging of the droplet per discharging is calculated by dividing the weight of the liquid made valid for every nozzle line 84 of each of the droplet discharging heads 62 obtained by the measurement by the number of dischargings. It should be noted that such processing is executed by the CPU 141 based on the measurement results stored in the RAM 143. Further, the amount of discharging of the droplet to be discharged is adjusted for every droplet discharging head 62 based on the weight information (the amount of discharging of the droplet per discharging) of the liquid. As the adjusting method, a method of changing an effective drive voltage applied to the piezoelectric elements of the droplet discharging head 62 in the drive waveform can be cited. Further, the amount of discharging of the droplet can also be changed by a method of changing the steepness in the drive waveform. In this case, the adjustment of the drive voltage is performed for each of the droplet discharging heads 62 and for each of the nozzle lines 84 so that the amount of discharging of the droplet for each of the three colors of liquids different from each other becomes a desired value. It should be noted that in each of the droplet discharging heads 62, if the amount of discharging of the droplet is substantially the desired value, the adjustment of the drive voltage can obviously be eliminated. Then, the process proceeds to the step S6.

The step S6 shown in FIG. 9 is an discharging step for drawing by discharging the liquid as droplets to the colored area A of the substrate W. In the step S6, while relatively moving the substrate W and the plurality of carriage units 21 facing each other, the liquid is discharged from the plurality of droplet discharging heads 62 as droplets. Since in the adjusting step the amount of discharging of the droplet is adjusted for every droplet discharging head 62 and for every nozzle line 84, it is possible to provide an appropriate amount of liquid to the colored area A for every color.

Subsequently, by passing through a solidifying step of solidifying the liquid discharged for drawing, the color filters of three colors 505R, 505G, and 505B are formed. As a method of solidifying the liquid including the colored layer forming material, a reduced-pressure drying method capable of evenly drying the solvent component in the liquid is preferably used.

Since in the method of manufacturing the color filter according to the present embodiment the method of discharging the liquid described above is used, the weight of the liquid discharged from each of the droplet discharging heads 62 is appropriately measured in the condition in which the plurality of carriage units 21 is arranged in the drawing area 31. Further, the amount of discharging of the droplet discharged to the colored area A of the substrate W is previously adjusted for each of the nozzle lines 84 of the droplet discharging head 62 so as to be an appropriate value for each of the three colors of liquids. Therefore, a necessary amount of droplets can stably be provided to the colored area A. By drying the provided liquid to be solidified, the colored layer with three colors of RGB having a desired film thickness can be formed in the colored area A. The liquid crystal display device 500 equipped with the color filter 505 thus manufactured has a high display quality with a desired optical characteristic.

Advantages of the embodiment described above are as follows.

In the droplet discharging device 1 according to the embodiment described above, by controlling the drive of the X-axis table 22, the plurality of carriage units 21 as arranged in the drawing area 31 and the weighing mechanism 91 can be disposed so as to face each other. Therefore, the weight of the liquid discharged from the plurality of droplet discharging heads 62 mounted thereon can be measured without modifying the arrangement of the plurality of carriage units 21 in actually discharging the liquid to the substrate W. Accordingly, the droplet discharging device 1, which is equipped with the weighing mechanism 91 capable of measuring the weight of the liquid more accurately with the plurality of carriage units 21 in the arrangement condition of actually discharging the liquid to perform drawing in comparison with the case in which the weight measurement is performed dividing the plurality of carriage units 21, can be provided.

2. In the droplet discharging device 1 according to the present embodiment, the weighing mechanism 91 is equipped with 14 electronic balances 95 corresponding to the arrangement of the two head groups 62L, 62R in the head unit 61 of each of the carriage units 21. Therefore, the weight of the liquid discharged from the 12 droplet discharging heads 62 mounted on each of the head units 61 can efficiently be measured.

3. In the droplet discharging device 1 according to the present embodiment described above, the weighing mechanism 91 is provided with the first droplet receiving sections 94 and the second droplet receiving section 92 surrounding the first droplet receiving sections 94. Accordingly, it is possible to eject the liquid from the droplet discharging heads 62, which are not the measuring object, at the same time as the droplet discharging head 62, which is the measuring object, ejects the liquid, and to receive the liquid. Therefore, in comparison with the case in which only the droplet discharging head 62 as the measuring object is driven to eject the liquid, the discharging state of the droplet can previously be stabilized in preparation for the weight measurement.

4. In the method of discharging the liquid according to the present embodiment described above, the droplet discharging device 1 is used, and in the measuring step, the plurality of carriage units 21 arranged in the drawing area 31 and the weighing mechanism 91 are disposed to face each other to eject the droplets based on the number of dischargings set for every nozzle line 84 of each of the droplet discharging heads 62, and the weight of the liquid thus discharged is measured. If the difference between the obtained weight of the liquid and the desired weight of the liquid is out of a predetermined range, the maintenance of each of the droplet discharging heads 62 is performed, and then the weight measurement is performed again. Then, in the adjusting step, the drive condition is modified and adjusted based on the valid weight information of the liquid (the amount of discharging of the droplet per discharging) so that the amount of discharging of the droplets discharged from each of the droplet discharging heads 62 becomes a predetermined amount of discharging. Therefore, in the discharging step, drawing can be performed by discharging an appropriate amount of droplets from each of the droplet discharging heads 62 to the desired area of the substrate W.

5. In the method of discharging the liquid according to the present embodiment described above, the liquid is discharged also from the droplet discharging heads 62, which are not the measuring object, towards the second droplet receiving section 92 in the measuring step. Therefore, the droplet discharging condition can previously be stabilized in preparation for the weight measurement.

6. In the method of manufacturing the color filter according to the present embodiment described above, since the method of discharging the liquid according to the embodiment described above is applied, drawing can be performed by discharging an appropriate amount of liquid for every color as droplets from each of the droplet discharging heads 62 to the colored area A. By solidifying the liquid thus discharged, the color filter with three colors of colored layers having a desired film thickness can be manufactured. By using the color filter manufactured by the present method, the liquid crystal display device 500 with a high display quality having a desired optical characteristic can be provided.

The embodiments of the invention are explained hereinabove, and the embodiments can be modified in various manners within the scope of the invention. The modified examples other than the embodiments described above, for example, are as follows.

FIRST MODIFIED EXAMPLE

Figure 10:
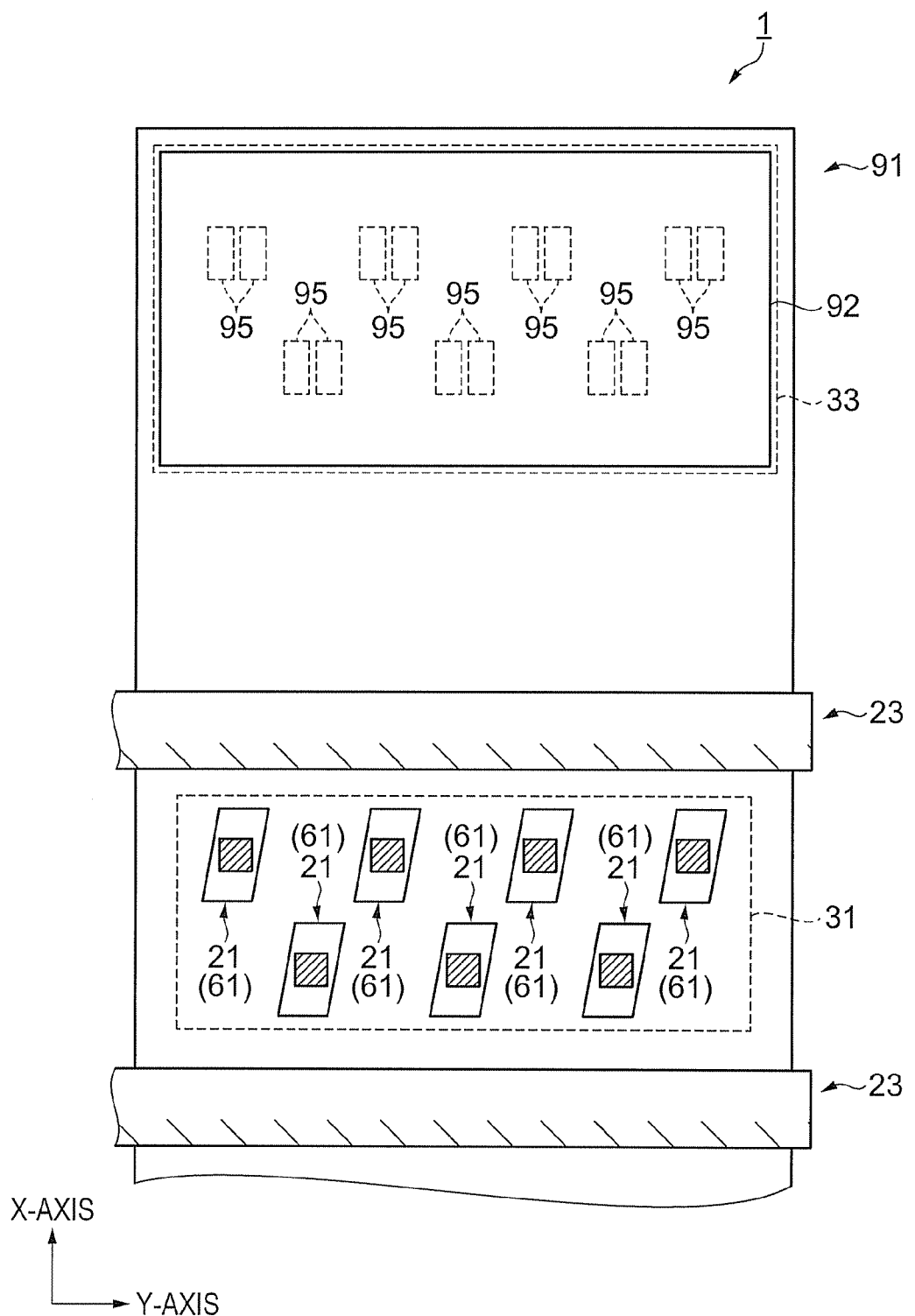
FIG. 10 is a schematic diagram showing an arrangement of the carriage units and the weighing mechanism of a modified example of the embodiment of the invention.

In the droplet discharging device 1 of the embodiment described above, the plurality of carriage units 21 is not so limited. FIG. 10 is a schematic diagram showing an arrangement of the carriage units and the weighing mechanism of the modified example. As shown in FIG. 10, for example, it is possible that the plurality of carriage units 21 is arranged in a zigzag manner in the Y-axis direction, and the weighing mechanism 91 is arranged to have the electronic balances 95 and the second droplet receiving section 92 and so on disposed corresponding to the carriage units. According to this configuration, since the carriage units 21 are not contiguous to each other, the weight measurement and actual drawing by discharging can be performed with reduced influences of, for example, heat radiation between the carriage units 21 to the discharging of the liquid.

SECOND MODIFIED EXAMPLE

In the droplet discharging device 1 according to the embodiment described above, the arrangement of the plurality of droplet discharging heads 62 mounted on the head unit 61 is not limited thereto. The droplet discharging device 1 is provided with the X-axis table 22 capable of moving the weighing mechanisms 91 independently in the X-axis direction, and the Y-axis table 23 capable of moving the carriage units 21 independently in the Y-axis direction. Therefore, the droplet discharging head 62 as the measuring object and the first droplet receiving section 94 can be disposed so as to face each other to perform the weight measurement providing the plurality of droplet discharging heads 62 are disposed on the head units 61 so that at least the nozzle lines 84 become parallel to the Y-axis direction.

THIRD MODIFIED EXAMPLE

In the weighing mechanism 91 of the droplet discharging device 1 of the embodiment described above, the number of electronic balances 95 as the weighing devices is not limited to 14. For example, only seven electronic balances 95, which is a half as many as the electronic balances 95 in the original embodiment, can be arranged corresponding to one head group 62L of each of the head units 61. Each of the carriage units 21 can only be shifted in the Y-axis direction in the case of setting the droplet discharging heads 62 included in the other head group 62R as the measuring object. According to this configuration, although the number of times of measurement is increased, the configuration of the device can be simplified.

FOURTH MODIFIED EXAMPLE

In the method of discharging the liquid of the embodiment described above, the judging step and the maintenance step are not inevitable. If, for example, these steps are eliminated, the advantages can be expected.

FIFTH MODIFIED EXAMPLE

In the method of manufacturing the color filter described above, the arrangement of the three colors of colored layers is not limited to the stripe type. It can cope with an arrangement of, for example, a mosaic type or a delta type. Further, the colored layer is not limited to three colors. For example, a layer of multicolor including R (red), G (green), B (blue), and other additional colors can be adopted.

SIXTH MODIFIED EXAMPLE

The method of manufacturing a device capable of applying the method of discharging the liquid according to the embodiment described above is not limited to the method of manufacturing the color filter. For example, in the liquid crystal display device 500, it can be applied to a coating process of an oriented film for orienting the liquid crystal or of the liquid crystal itself. Further, it can be applied to a method of forming an organic EL light-emitting layer by coating a liquid containing a light-emitting material in an area partitioned by partitioning sections.

What is claimed is:

1. A droplet discharging device for drawing by discharging a liquid as droplets on a work from an discharging head in accordance with a main scan for relatively moving the work and the discharging head facing each other, comprising:
    a plurality of carriages each mounting a plurality of the discharging heads;
    a table support section having an absorption table, the work being set on the absorption table;
    a first slider that supports the table support section;
    a weighing mechanism for measuring weight of the discharged liquid for every discharging head;
    a second slider that supports the weighing mechanism; and
    a main scan moving mechanism for moving the weighing mechanism and the table support section in a direction of the main scan independently from each other and for slidably moving the first slider and the second slider,
    wherein the weighing mechanism includes:
        a first droplet receiving section provided for each of the plurality of carriages and capable of receiving the droplet discharged from at least one of the discharging heads, and
        a second droplet receiving section disposed in accordance with an arrangement of the plurality of discharging heads mounted on the plurality of carriages so as to surround the first droplet receiving section.

2. The droplet discharging device according to claim 1, wherein the weighing mechanism is provided with at least the same number of weighing devices as the number of the carriages corresponding to the plurality of carriages.

3. A droplet discharging device for drawing by discharging a liquid as droplets on a work from a discharging head in accordance with a main scan for relatively moving the work and the discharging head facing each other, comprising:
    a plurality of carriages each mounting a plurality of the discharging heads;
    a weighing mechanism for measuring weight of the discharged liquid for every discharging head; and
    a main scan moving mechanism for moving the weighing mechanism and the work in a direction of the main scan independently from each other,
    wherein the weighing mechanism is disposed in a direction perpendicular to the direction of the main scan and along a drawing area in which the plurality of discharging heads mounted on the plurality of carriages can perform drawing by discharging; and
    wherein the weighing mechanism includes:
        a first droplet receiving section provided for each of the plurality of carriages and capable of receiving the droplet discharged from at least one of the discharging heads, and
        a second droplet receiving section disposed in accordance with an arrangement of the plurality of discharging heads mounted on the plurality of carriages so as to surround the first droplet receiving section.

4. The droplet discharging device according to claim 3, wherein the weighing mechanism is provided with at least the same number of weighing devices as the number of the carriages corresponding to the plurality of carriages.

* * * * *